United States Patent [19]

Yamamoto

[11] Patent Number: 4,739,310

[45] Date of Patent: Apr. 19, 1988

[54] KEYBOARD CONTROL SYSTEM

[75] Inventor: Tatsuo Yamamoto, Tokyo, Japan

[73] Assignee: Kabushiki Kaisha Toshiba, Kawasaki, Japan

[21] Appl. No.: 792,563

[22] Filed: Oct. 29, 1985

[30] Foreign Application Priority Data

Oct. 30, 1984 [JP] Japan .................................. 59-228503

[51] Int. Cl.⁴ ................................................ G06F 3/02
[52] U.S. Cl. .............................. 340/365 S; 340/365 R
[58] Field of Search ............ 340/365 S, 365 C, 365 R, 340/365 VL; 400/475, 477; 364/700, 705, 709

[56] References Cited

U.S. PATENT DOCUMENTS

| 4,279,021 | 7/1981 | See et al. ........................ 340/365 VL |
| 4,305,135 | 12/1981 | Dahl et al. ......................... 340/365 S |
| 4,333,097 | 6/1987 | Buric et al. .................... 340/365 VL |
| 4,459,581 | 7/1984 | Wilson et al. .................... 340/365 E |
| 4,502,038 | 2/1985 | Lowenthal et al. ............. 340/365 S |
| 4,502,039 | 2/1985 | Vercesi et al. .................. 340/365 S |
| 4,591,833 | 5/1986 | Ishii et al. ......................... 340/365 S |
| 4,609,908 | 9/1986 | Amano ............................. 340/365 S |

OTHER PUBLICATIONS

"Direct Diagnostic of Keyboard Hardware on a Personal Computer"—IBM Technical Disclosure Bulletin—vol. 28, No. 2, Jul./1985—pp. 758-759.
W. L. Holloway, II—"Elimination of False Data Caused Bounce of a Switch-Contact Keyboard"—IBM Technical Disclosure Bulletin—vol. 27, No. 5, Oct./1984—pp. 3173-3174.

Primary Examiner—John W. Caldwell, Sr.
Assistant Examiner—Mahmoud Fatahi-Yar
Attorney, Agent, or Firm—Finnegan, Henderson, Farabow, Garrett & Dunner

[57] ABSTRACT

A keyboard control system is comprised of a key matrix circuit and a keyboard controller. The key matrix circuit includes scanning lines and return lines, these lines being connected to keys on a keyboard, a decoder for transferring a scanning signal to each scanning line, and a receiver for receiving a return signal as a scanning signal returned through a return line and by the depressed key. The keyboard controller generates a key matrix code corresponding to the depressed key on the basis of an address of a scanning line to which the scanning signal is output and an address of a return line through which the return signal is input. The keyboard controller stores the generated key matrix code into a keyboard buffer memory. When the depressed key is a special key for display, the keyboard controller generates a key matrix code in response to the key depression and displays predetermined data on a screen. Key release of the key is detected and, upon detection of the key release, a key release status flag is added to the key matrix code in the keyboard buffer memory, thereby invalidating the key matrix code and extinguishing the data display.

4 Claims, 3 Drawing Sheets

F I G. 1
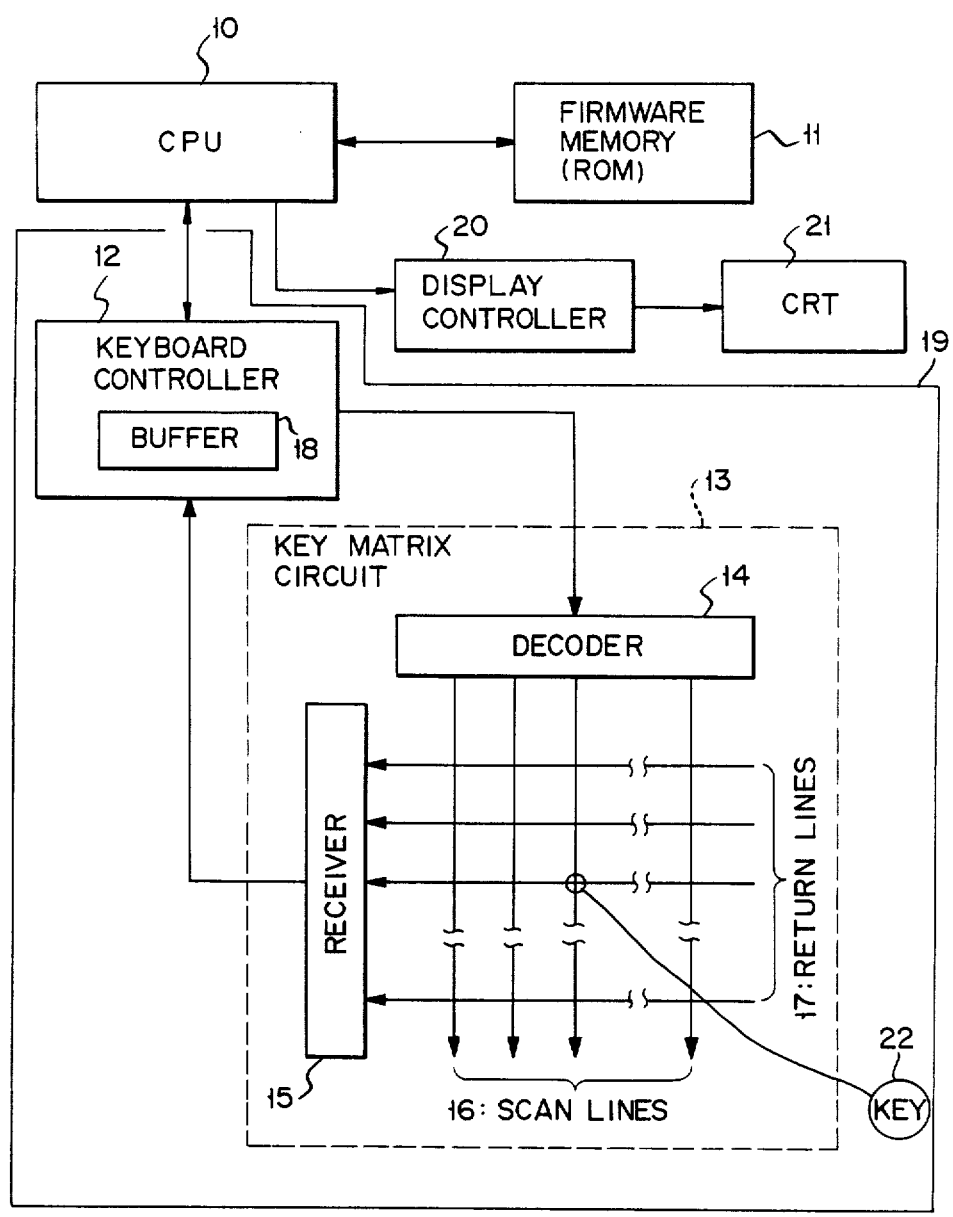

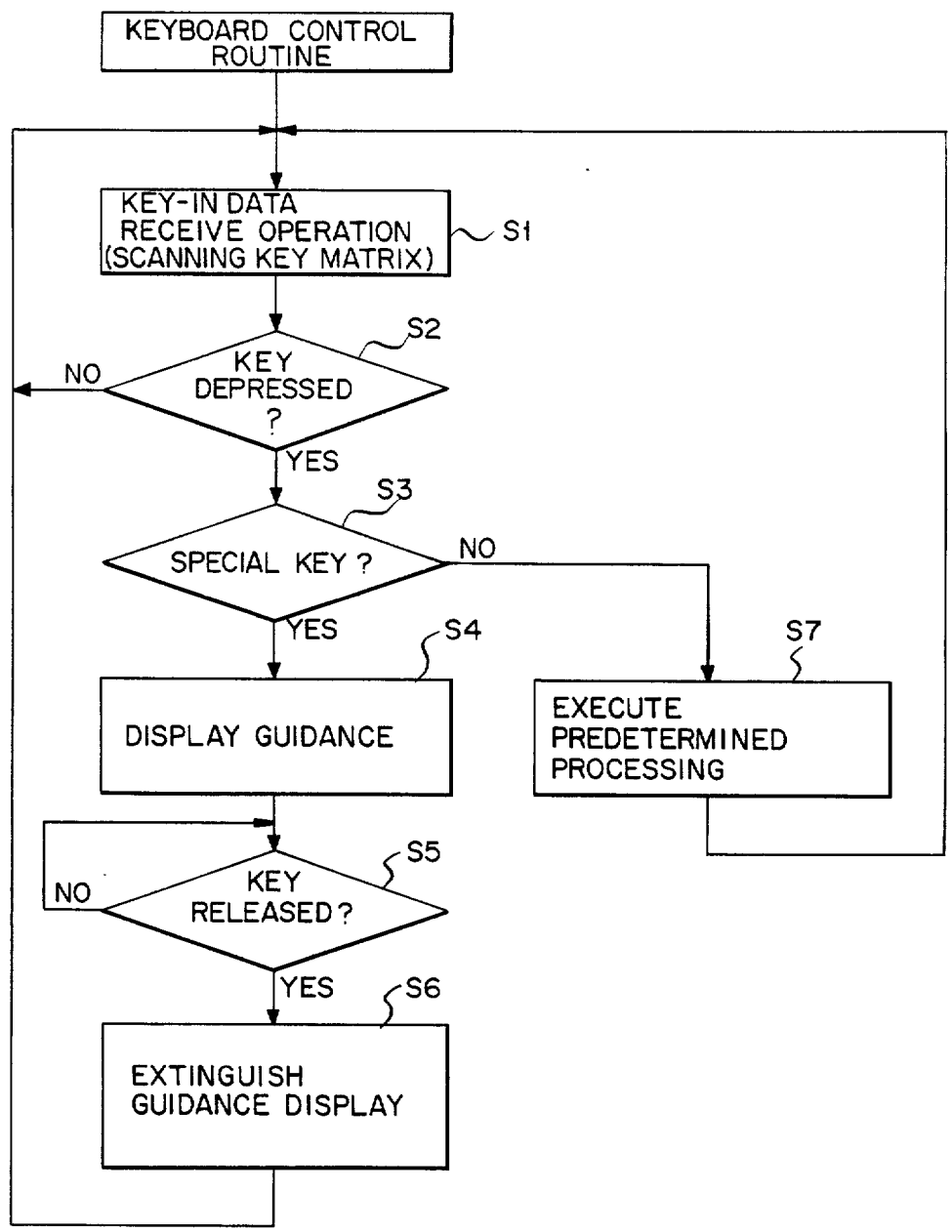

KEYBOARD CONTROL SYSTEM

BACKGROUND OF THE INVENTION

This invention relates to a keyboard control system for controlling the input operation to a keyboard.

Generally, a keyboard is connected to a keyboard controller which responds to the depression of a key on the keyboard by generating a key matrix code corresponding to the depressed key, and by supplying the code to a CPU or the like. When an ordinary keyboard controller detects a fresh key depression, it validates a key matrix code related to the operated key and stores it in a keyboard buffer memory. The keyboard controller, if it has a repeat function, repeatedly stores the key matrix code into the keyboard buffer memory at fixed intervals, for as long as the key depression continues. Thus, the keyboard controller validates the key matrix code whenever the key is depressed, or when its depression continues for an extended period.

However, the keyboard controller cannot invalidate the key matrix code after it has been validated, even if the key corresponding to the valid code is released from its depressed state. After a key matrix code has been validated in the prior keyboard controller, it cannot be invalidated until another key is depressed. With respect to ordinary function keys, the continuing validity of the key matrix code does not create a problem. With respect to a special function key contained in the keyboard of computer terminal equipment for the function of displaying a guidance, this undeterred validity creates a problem such that the guidance display cannot be extinguished.

To cope with this problem, a lock key capable of invalididating the key matrix code and accommodated with an alternate mechanism has recently been developed. This key operates such that the first depression of the key mechanically locks the key, while the second depression releases the key from its locked state. When it is locked, a key matrix code associated with the key is validated. When it is unlocked, the code is invalidated. Unfortunately, however, this type of key has some disadvantages. For example, the mechanism to lock the key is complicated in structure and therefore expensive to manufacture. Further, double key actions are required for locking and unlocking operations, therby making the keyboard operation time consumming and laborious.

SUMMARY OF THE INVENTION

Accordingly, an object of the present invention is to provide a keyboard control system which can detect the release of a depressd key to invalidate a key matrix code associated with the depressed key, and which, in its simple design structure, can improve key operation on a keyborad.

To achieve the above object, there is provided a keyboard control system comprising code generating means for generating a key matrix code associated with a depressed key, a keyboard buffer memory for storing the key matrix code generated by said code generating means, and key release control means for detecting key release and for adding keyboard buffer memory.

BRIEF DESCRIPTION OF THE DRAWINGS

FIG. 1 is a block diagram of an embodiment of terminal equipment according to the present invention;

FIG. 3 is a flowchart showing the operation of the keyboard controller in the embodiment of FIG. 1.

DETAILED DESCRIPTION OF THE PREFERRED EMBODIMENTS

Figure 4:
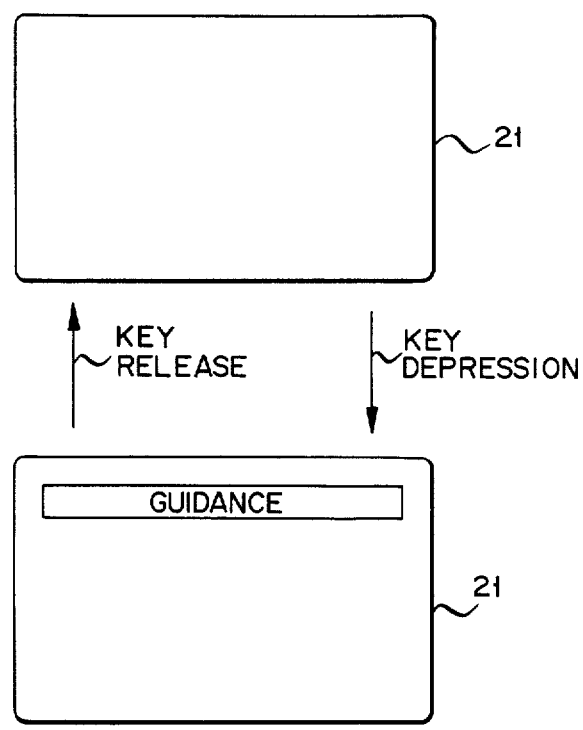
FIG. 4 shows an example of the display control according to this embodiment.

An embodiment of the keyboard controller according to the present invention will be described referring to the accompanying drawings. A keyboard 19 to be used in this embodiment is, by way of example, the one used in the terminal equipment of a computer system. FIG. 1 shows this embodiment in block form. As shown, a CPU 10 is connected to a firmfare memory (ROM) 11 and a keyboard controller 12. The keyboard controller 12 is used for entering key-in data from a key matrix circuit 13 into the CPU 10. The transmission of the key-in data from the keyboard controller to the CPU 10 is performed by a conventional method as shown in U.S. Pat. No. 4,482,955. The firmware memory stores instruction sequences representing functions which are executed by the CPU 10. In this embodiment, one of the functions is displaying a guidance message as shown in FIG. 4 on a CRT 21.

The keyboard controller 12 is controlled by the CPU 10, using a program prestored in the firmfare memory 11. A key matrix circuit 13 is connected to the keyboard controller 12. As will be described, the keyboard matrix crcuit 13 has a plurality of keys 22 including a special key for guidance display of the terminal equipment, in addition to the ordinary data keys. The key matrix circuit 13 contains a decoder 14, a receiver 15, scanning lines 16, and return lines 17. The keys 22 on the keyboard 19 are arranged above the intersections of the scanning lines 16 and the return lines 17. Under control of the keyboard controller 12, the decoder 14 sequentially and periodically outputs scanning signals to the scanning lines 16. When a key connected to a selected scanning line to which the scanning signal is output is depressed, the selected scan line is electrically connected to a return line connected to the depressed key so that the scanning signal, as a return signal related to the key, is supplied through the return line 17 to the receiver 15, and further input to the keyboard controller 12.

Figure 2:
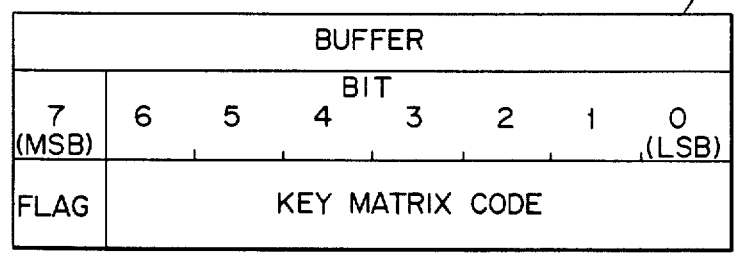
FIG. 2 shows the bit arrangement of the data stored in the buffer memory within the keyboard controller shown in FIG. 1.

The keyboard controller 12 generates a key matrix code using an address of the scanning line outputting the scanning sisgnal and an address of the return line providing the return signal, and stores the key matrix code into a keyboard buffer memory 18. In this embodiment, the key matrix code is 7-bit data. The keyboard buffer memory 18, as shown in FIG. 2, has a capacity of 8 bits. In the buffer, 0th (LSB) to 6th bits are for storing the key matrix code, and the 7th bit (MSB) is for storing a flag matrix ciruclt 13 has a plurality of keys 22 including which will be described later. The CPU 10 is connected to a CRT display 21 via a display controller 20.

The operation of the CPU 10 will be described referring to the flowchart shown in FIG. 3. The keyboard controller 12 transfers the scan address signal to the decoder 14. The decoder 14 outputs a scan address signal to a scanning line. (The operation up to this time is performed in a first step, S1). The scanning operation as shown in the aforementioned U.S. Pat. No. 4,482,955 may be adapted to the scanning operation of the keyboard controller 12.

Until it detects the depression of a key, the keyboard controller 12 changes the keys which are scanned by the scan address, and reads a return address from the key matrix circuit 13. When a key connected to the scanning line 16 to which the scanning signal is output is depressed, a key depresssion signal is input as a return signal to the receiver 15 through a return line which is connected to the scanning line to which the scanning signal is output. Then, this signal, as a return address signal is transferred from the receiver 15 to the keyboard controller 12. The keyboard controller stores the key matrix code corresponding to the scan address signal and the return address signal in the buffer memory 18 with the data stored in the flag attributed to the key matrix code representing that the key matrix code is the depressed-key code. Then the keyboard controller 18 transmits the key matrix code with the flag tothe CPU 10. So, the CPU 10 fetches the depression signal through the keyboard controller 12 (step S2).

When the key matrix code with the flag representing key addressing is received, the CPU 10 checks if the depressed key is a special function key (step S3). The check is made by comparing the key matrix code with special key matrix codes stored in a table in the firmware memory 11. If the answer is YES, the CPU 10, in response to the key matirx code, displays a guidance on the CRT display 21 as shown in FIG. 4. (step S4) Following this, the keyboard controller 12 checks if the key is released (step S5). Since the return signal corresponding to the depressed key disappears when the key is released, the CPU can detect the releasing of the key. This step, S5, is repeated till the key release is detected. When the key release is detected, they keyboard controller 12 stores the key matrix code with a key release status flag being set in the keyboard buffer memory 18 (step S6). Then, the keyboard controller 12 sends the key matrix code with the flag representing a releasing status of the depressed key to the CPU 10. When the key matrix code with the flag being set is received by the CPU 10, the CPU excutes another function in response to the key matrix code wherein the CPU extinquishes the guidance display (see FIG. 4). Then, control is returned to step S1.

When the key depressed in step S3 is an ordinary data key, and not the special function key the keyboard controller 12 generates a key matrix code (valid) according to the scan address and the return address and loads it into the keyboard buffer memory 18. The keyboard controller 12 sends the key matrix code to the CPU 10. The CPU 10 checks whether the key matrix code is the special function key or not. When the CPU 10 detects that the matrix code is one of the ordinary data keys, it executes the necessary predetermined processing (step S7). In the case of depression of the ordinary data key, the CPU 10 ignores the key matrix code corresponding to the key with the flag being set which is transmitted from the keyboard controller 12 when the ordinary data key is released. Thus, when the depressed key is a data key, releasing the ordinary data key is not significant for operation of the terminal equipment.

As seen from the foregoing, in the keyboard control system of the present invention, the CRT display starts to display the guidance upon depression of a special function key. The guidance display continues during the depression of the special function key. When an operator removes his finger from the key to release the key from its depressed state, the CRT display extinguishes the guidance display. Thus, the single action involving the depression and release of a single key by an operator, in this instance that of a special function key, can perform the dual function of data display and display extinction. This feature renders key operation and that of the apparatus as a whole very effective. Further, the depression state of a key is locked not in a mechanical manner but in a software manner such that a key release flag is added to the key matrix code in the keyboard buffer memory. In this respect, the present invention successfully solves the problems of excessive mechanical complexity and its resultant cost.

The present invention is, as should be obvious, clearly applicable for use in devices other than the above-mentioned computer terminal equipment keyboard. Further, the special key is not limited in function to that of a display special key, as in the above-mentioned embodiment.

What is claimed is:

1. A computer system comprising:
   memory means for storing instructions;
   processing means connected to the memory means for executing functions in accordance with instructions stored in the memory means;
   keyboard means connected to the processing means for entering key-in data to be processed by the processing means into the processing means;
   said keyboard means including,
   (a) a plurality of keys including data keys for entering data into said processing means and function keys for instructing said processing means to execute functions in accordance with instructions stored in said memory means,
   (b) detecting means for detecting the actuation and release of each of said keys, and
   (c) key-in data sending means for sending a first key-in data representing actuation of a key detected by said detecting means and for sending a second key-in data representing release of the key detected thereby, both said first and second key-in data including a key-data portion representing key-data corresponding to a key depressed or released and a key-release status portion representing whether the key corrsponding to the key-data has been depressed or has been released; and
   said processing means further including means for executing a function in response to said first key-in data sent from said keyboard means and for executing another function in response to said second key-in data sent from said keyboard means, whereby releasing said keys is significant for operating the computer system as well as depression thereof and said processing means does not execute a function when the data keys are released.

2. A computer system according to claim 1, wherein said key-in data sending means of the keyboard means includes keyboard buffer memory means for storing said first and second key-in data to be transmitted to said processing means.

3. A computer system according to claim 2, wherein said detecting means of the keyboard means includes scanning means for sending a scanning signal to said keys in turn, and said detecting means detects actuation and release of said keys according to existance of said scanning signal returned through an actuated key.

4. A computer system according to claim 1, wherein said key-in data transmitted to the processing means includes a flag portion for distinguishing between the first key-in data and the second key-in data.

* * * * *